United States Patent
Baniecki et al.

(10) Patent No.: US 11,087,930 B2
(45) Date of Patent: Aug. 10, 2021

(54) OXYGEN GENERATION APPARATUS

(71) Applicant: FUJITSU LIMITED, Kawasaki (JP)

(72) Inventors: John David Baniecki, Zama (JP); Hiroyuki Aso, Atsugi (JP); Yoshihiko Imanaka, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 312 days.

(21) Appl. No.: 16/017,282

(22) Filed: Jun. 25, 2018

(65) Prior Publication Data

US 2019/0006120 A1 Jan. 3, 2019

(30) Foreign Application Priority Data

Jun. 29, 2017 (JP) .............................. JP2017-127173

(51) Int. Cl.
| | |
|---|---|
| *H01G 9/20* | (2006.01) |
| *C25B 1/02* | (2006.01) |
| *C25B 1/55* | (2021.01) |
| *C25B 11/051* | (2021.01) |
| *C25B 11/057* | (2021.01) |
| *C25B 11/077* | (2021.01) |

(52) U.S. Cl.
CPC .............. *H01G 9/2027* (2013.01); *C25B 1/02* (2013.01); *C25B 1/55* (2021.01); *C25B 11/051* (2021.01); *C25B 11/057* (2021.01); *C25B 11/0773* (2021.01)

(58) Field of Classification Search
CPC ................. C25B 11/04–11/0494; C25B 1/003
See application file for complete search history.

(56) References Cited

U.S. PATENT DOCUMENTS

| | | |
|---|---|---|
| 2012/0156578 A1 | 6/2012 | Taniguchi et al. |
| 2015/0214411 A1* | 7/2015 | Guerra ................ H01L 31/0549 |
| | | 136/257 |

(Continued)

FOREIGN PATENT DOCUMENTS

| | | |
|---|---|---|
| WO | 2011/121932 | 10/2011 |
| WO | 2012/137240 | 10/2012 |

OTHER PUBLICATIONS

Larramona et al ("Characterization of the Mixed Perovskite BaSn1—xSbxO3, by Electrolyte Electroreflectance, Diffuse Reflectance, and X-Ray Photoelectron Spectroscopy", Journal of the Chemical Society, Faraday Transactions 1: Physical Chemistry in Condensed Phases, 1989, 85(4), pp. 907-916) (Year: 1989).*

(Continued)

*Primary Examiner* — Alexander W Keeling
(74) *Attorney, Agent, or Firm* — Fujitsu Patent Center

(57) ABSTRACT

An oxygen generation electrode includes, a conductive layer including a salt of stannic acid, the salt of stannic acid having a perovskite structure, a light absorption layer disposed on the conductive layer, and a catalyst layer disposed on the light absorption layer, the catalyst layer including an oxide having a perovskite structure and being responsible for an oxygen evolution reaction, the conductive layer being doped to degeneracy with impurities, the light absorption layer forming a Type-II heterojunction with the conductive layer, the catalyst layer being doped to degeneracy with impurities, the upper end of the valence band of the catalyst layer being higher than the upper end of the valence band of the light absorption layer.

10 Claims, 6 Drawing Sheets

(56) References Cited

U.S. PATENT DOCUMENTS

2016/0076158 A1* 3/2016 Tamura .................. C25B 1/003
204/242
2016/0237578 A1* 8/2016 Ichikawa ............ C25B 11/0478

OTHER PUBLICATIONS

Shirahata et al ("Fabrication and characterization of bismuth ferrite as an electron transport layer in perovskite photovoltaic devices", Journal of the Ceramic Society of Japan, 124, 5, pp. 602-605, 2016) (Year: 2016).*

Li et al ("Sol-gel combustion synthesis and visible-light-driven photocatalytic property of perovskite LaNiO3", Journal of Alloys and Compounds, 491, 2010, pp. 560-564) (Year: 2010).*

Benthem et al ("Bulk electronic structure of SrTiO3 Experiment and theory", Journal of Applied Physics, 90, pp. 6156-6164, 2001 ) (Year: 2001).*

* cited by examiner

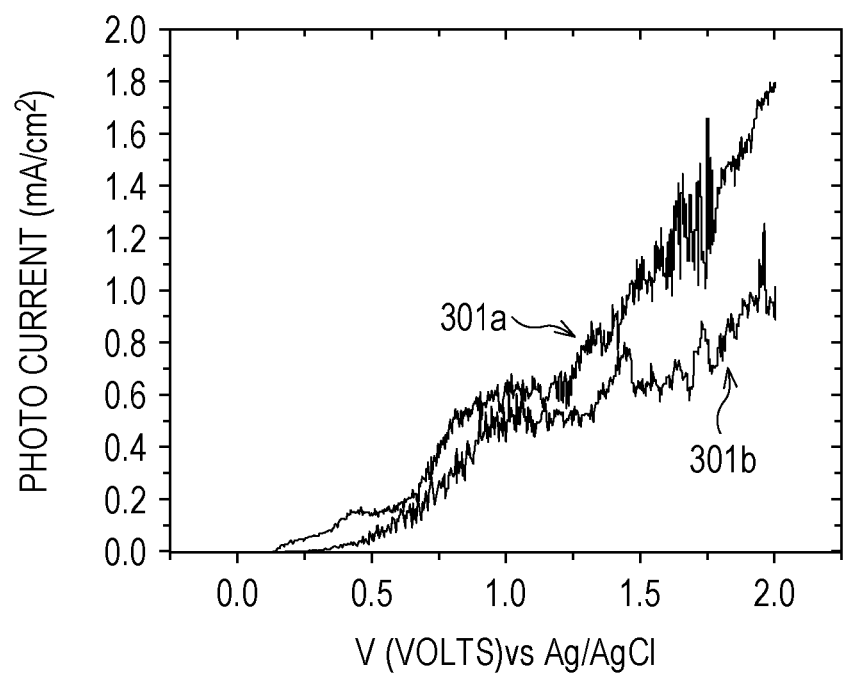

OXYGEN GENERATION APPARATUS

CROSS-REFERENCE TO RELATED APPLICATION

This application is based upon and claims the benefit of priority of the prior Japanese Patent Application No. 2017-127173, filed on Jun. 29, 2017, the entire contents of which are incorporated herein by reference.

FIELD

The embodiments discussed herein are related to an oxygen generation electrode and an oxygen generation apparatus.

BACKGROUND

Technologies in which an oxygen gas is generated by decomposition of water have been studied. In these technologies, electron-hole pairs are generated in a light absorption layer and an oxygen gas is generated in an oxygen generation electrode disposed on the anodic side. Known oxygen generation electrodes include, for example, iridium oxide, ruthenium oxide, indium tin oxide (ITO), or fluorine-doped tin oxide (FTO).

However, iridium, indium, and ruthenium are expensive elements. Furthermore, FTO is thermally unstable.

International Publication Pamphlet Nos. WO 2011/121932 and WO 2012/137240 disclose the related technologies.

SUMMARY

According to an aspect of the embodiments, an oxygen generation electrode includes, a conductive layer including a salt of stannic acid, the salt of stannic acid having a perovskite structure, a light absorption layer disposed on the conductive layer, and a catalyst layer disposed on the light absorption layer, the catalyst layer including an oxide having a perovskite structure and being responsible for an oxygen evolution reaction, the conductive layer being doped to degeneracy with impurities, the light absorption layer forming a Type-II heterojunction with the conductive layer, the catalyst layer being doped to degeneracy with impurities, the upper end of the valence band of the catalyst layer being higher than the upper end of the valence band of the light absorption layer.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 is a graph illustrating voltage-photo current relationships.

DESCRIPTION OF EMBODIMENTS

Embodiments are described specifically with reference to the attached drawings.

First Embodiment

Figure 1:
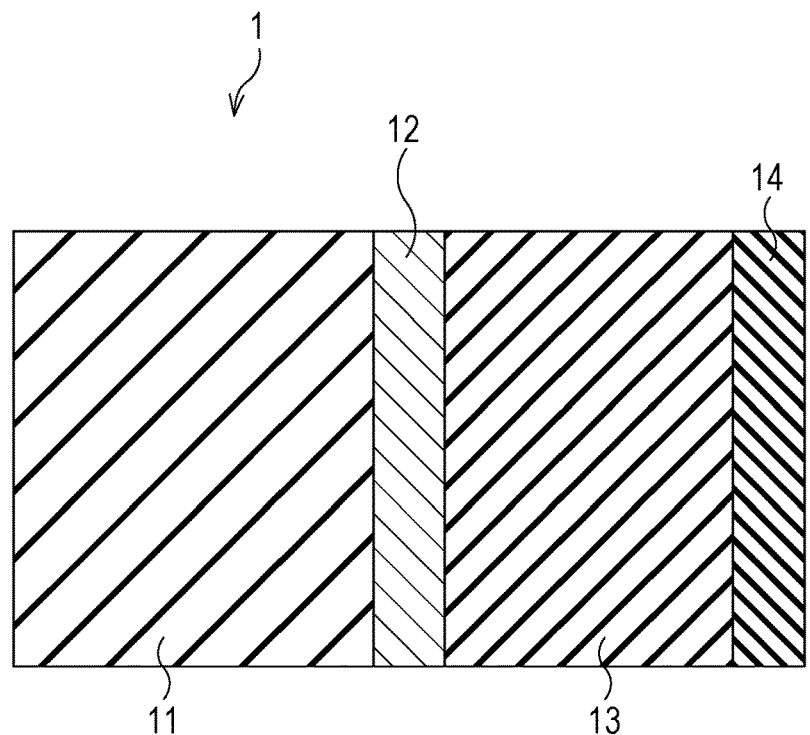
FIG. 1 is a cross-sectional view of an oxygen generation electrode according to the first embodiment.
Figure 2:
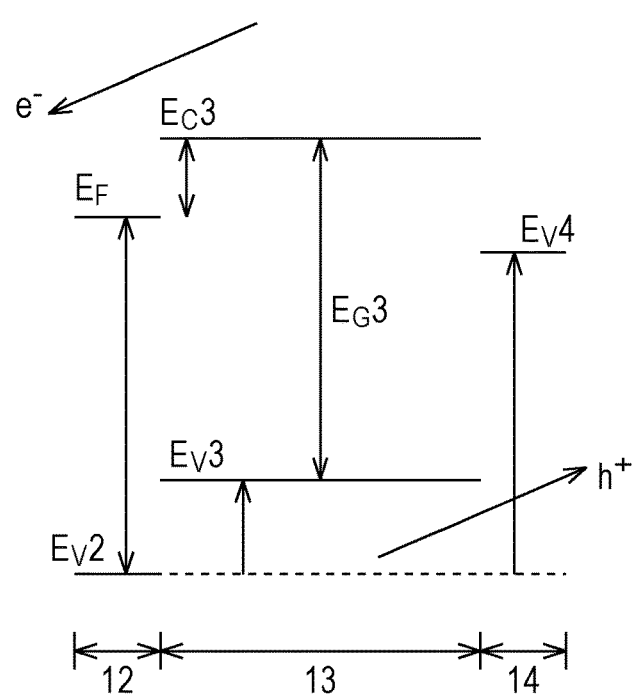
FIG. 2 is a diagram illustrating the relationship among the energy levels in an oxygen generation electrode according to the first embodiment.

The first embodiment is described below. The first embodiment describes an example of an oxygen generation electrode. FIG. 1 is a cross-sectional view of an oxygen generation electrode according to the first embodiment. FIG. 2 is a diagram illustrating the relationship among the energy levels in the oxygen generation electrode according to the first embodiment.

As illustrated in FIG. 1, an oxygen generation electrode 1 according to the first embodiment includes a conductive layer 12 including a salt of stannic acid which has a perovskite structure, a light absorption layer 13 disposed on the conductive layer 12, and a catalyst layer 14 disposed on the light absorption layer 13 which includes an oxide having a perovskite structure and is responsible for an oxygen evolution reaction. The conductive layer 12 is doped to degeneracy with impurities. The catalyst layer 14 is doped to degeneracy with impurities. The light absorption layer 13 forms a Type-II heterojunction with the conductive layer 12 as illustrated in FIG. 2. Thus, the upper end $E_V3$ of the valence band of the light absorption layer 13 is higher than the upper end $E_V2$ of the valence band of the conductive layer 12. The upper end $E_V4$ of the valence band of the catalyst layer 14 is higher than the upper end $E_V3$ of the valence band of the light absorption layer 13. That is, the level of the upper end of valence band increases in a stepwise manner in the direction from the conductive layer 12 to the catalyst layer 14. The oxygen generation electrode 1 further includes a substrate 11 disposed on the conductive layer 12 so as to face the light absorption layer 13 across the conductive layer 12. In other words, the conductive layer 12, the light absorption layer 13, and the catalyst layer 14 are formed on and above the substrate 11.

Upon the light absorption layer 13 absorbing light incident on the oxygen generation electrode 1, electron-hole pairs are generated in the light absorption layer 13 and holes move into the catalyst layer 14 as illustrated in FIG. 2. In the case where the oxygen generation electrode 1 is immersed in an aqueous electrolyte solution, the holes oxidize water to an oxygen gas on the surface of the catalyst layer 14.

For example, the substrate 11 may be a $(La_{0.3}Sr_{0.7})(Al_{0.65}Ta_{0.35})O_3$ (LSAT) substrate having a thickness of 0.5 mm and a surface having a Miller index of (001). The conductive layer 12 may be a $Ba_{0.97}La_{0.03}SnO_3$ (BLSO) layer having a thickness of 60 nm. The light absorption layer 13 may be a $BiFeO_3$ (BFO) layer having a thickness of 100 nm. The catalyst layer 14 may be a $La_{0.7}Sr_{0.3}CoO_3$ (LSCO) layer having a thickness of 1 nm. The LSAT substrate has a band gap of 5 eV and is optically transparent. The BFO layer has a band gap of 2.8 eV. The BLSO layer, the BFO layer, and the LSCO layer are deposited on and above the LSAT substrate by, for example, pulsed laser deposition (PLD). The elements included in the above layers are relatively inexpensive. The above layers are thermally stable and not likely to degrade while the oxygen generation electrode is produced or operated.

For example, the substrate 11 may be an MgO substrate having a thickness of 0.5 mm and a surface having a Miller index of (001). The conductive layer 12 may be a $Ba_{0.97}La_{0.03}SnO_3$ (BLSO) layer having a thickness of 60 nm. The light absorption layer 13 may be a $BiFeO_3$ (BFO) layer having a thickness of 100 nm. The catalyst layer 14 may be a $La_{0.7}Sr_{0.3}CoO_3$ (LSCO) layer having a thickness of 1 nm. The MgO substrate has a band gap more than 5 eV and is optically transparent. The BLSO layer, the BFO layer, and the LSCO layer are deposited on and above the MgO substrate by, for example, pulsed laser deposition (PLD). The elements included in the above layers are relatively inexpensive. The above layers are thermally stable and not likely to degrade while the oxygen generation electrode is produced or operated.

For example, the substrate 11 may be a $(La_{0.3}Sr_{0.7})(Al_{0.65}Ta_{0.35})O_3$ (LSAT) substrate having a thickness of 0.5 mm and a surface having a Miller index of (001). The conductive layer 12 may be a $Ba_{0.97}La_{0.03}SnO_3$ (BLSO) layer having a thickness of 60 nm. The light absorption layer 13 may be a $LaFeO_3$ (LFO) layer having a thickness of 100 nm. The catalyst layer 14 may be a $PrNiO_3$ (PNO) layer having a thickness of 1 nm. The LFO layer has a band gap of 2.5 eV. The BLSO layer, the LFO layer, and the PNO layer are deposited on and above the LSAT substrate by, for example, pulsed laser deposition (PLD). The elements included in the above layers are relatively inexpensive. The above layers are thermally stable and are likely to degrade while the oxygen generation electrode is produced or operated.

Since the oxygen generation electrode according to the first embodiment includes the conductive layer 12 including a salt of stannic acid which has a perovskite structure, the light absorption layer 13, and the catalyst layer 14, the oxygen generation electrode may have markedly high thermal stability although relatively inexpensive elements are used for producing the oxygen generation electrode.

For example, the salt of stannic acid which is included in the conductive layer 12 may be an n-type semiconductor, and the oxide included in the catalyst layer 14 may be a p-type semiconductor. The material for the conductive layer 12 is not limited. The conductive layer 12 may include, for example, $Ba_{1-x}La_xSnO_3$, $BaSn_{1-x}Sb_xO_3$, $Sr_{1-x}La_xSnO_3$, or $SrSn_{1-x}Sb_xO_3$, where $0<x<1$. The material for the catalyst layer 14 is not limited. The catalyst layer 14 may include, for example, Co, Fe, Ni, or any combination of Co, Fe, and Ni.

The band gap $E_G3$ of the light absorption layer 13 is preferably 3 eV or less. If the band gap $E_G3$ exceeds 3 eV, the light absorption layer 13 may fail to absorb the light to a sufficient degree. The light absorption layer 13 may fail to absorb the light to a sufficient degree also if the band gap $E_G3$ is less than 1 eV. Accordingly, the band gap $E_G3$ is preferably 1 eV or more and 3 eV or less. The material for the light absorption layer 13 is not limited. The light absorption layer 13 may include, for example, an oxide having a perovskite structure, such as $BiFeO_3$ or $LaFeO_3$.

The band gap of the substrate 11 is preferably 3 eV or more. Setting the band gap of the substrate 11 to be 3 eV or more increases the amount of light that reaches the light absorption layer 13 even when the light is incident on the substrate-11-side surface of the oxygen generation electrode. In contrast, if the band gap of the substrate 11 is less than 3 eV, the substrate 11 may absorb the light and the amount of light that reaches the light absorption layer 13 may be reduced accordingly. The material for the substrate 11 is not limited. The substrate 11 may include, for example, $SrTiO_3$ (STO), $(La_{0.3}Sr_{0.7})(Al_{0.65}Ta_{0.35})O_3$ (LSAT), $LaAlO_3$ (LAO), MgO, $NdGaO_3$, or $DyScO_3$. The oxygen generation electrode 1 may optionally include a porous layer disposed on the catalyst layer 14, such as a porous Au layer.

Second Embodiment

Figure 3:
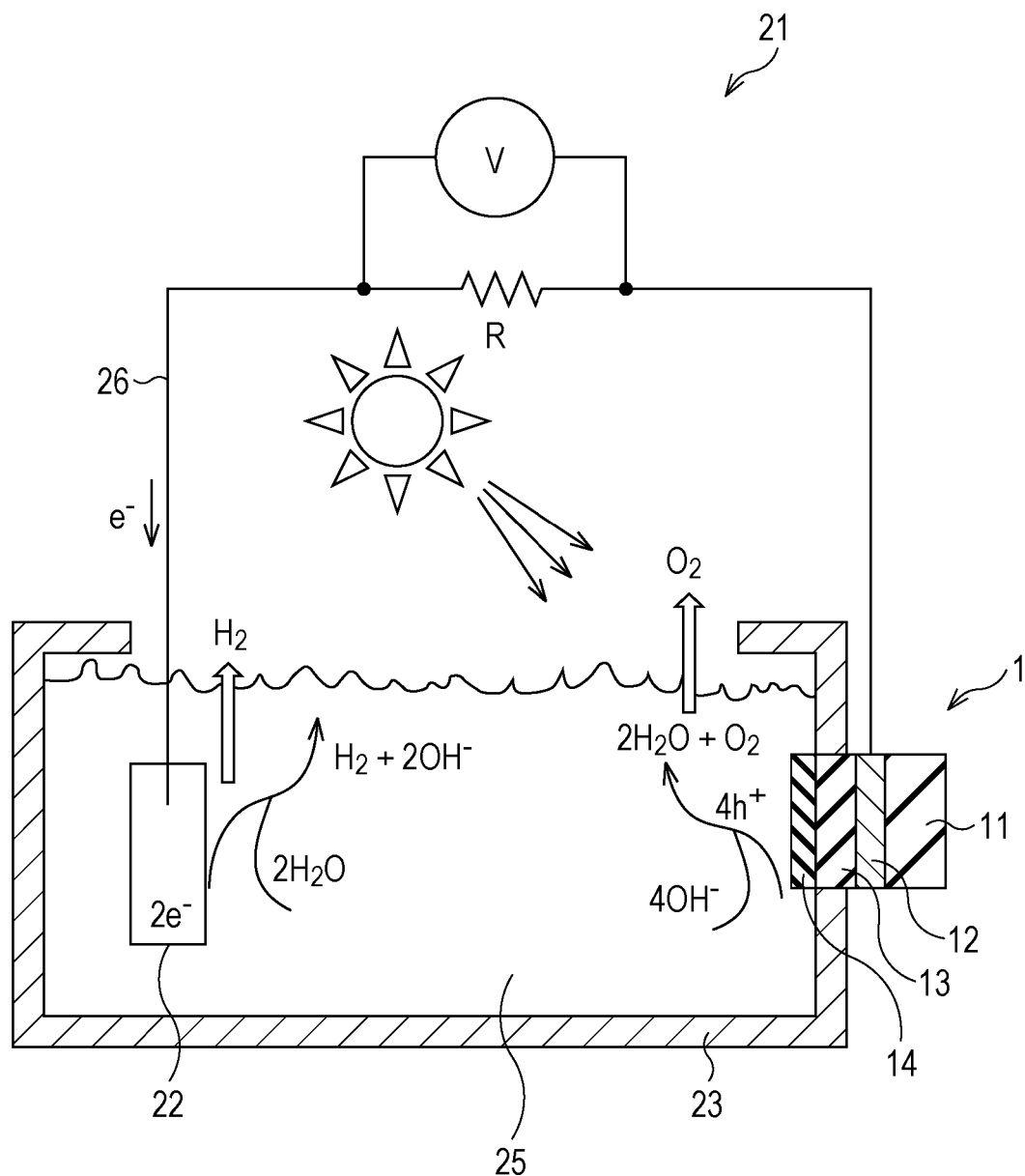
FIG. 3 is a diagram illustrating an oxygen generation apparatus according to the second embodiment.

The second embodiment is described below. The second embodiment relates to an oxygen generation apparatus including the oxygen generation electrode 1. FIG. 3 is a diagram illustrating the oxygen generation apparatus according to the second embodiment.

As illustrated in FIG. 3, an oxygen generation apparatus 21 according to the second embodiment includes a tank 23, an aqueous electrolyte solution 25 charged in the tank 23, the oxygen generation electrode 1 according to the first embodiment which is arranged such that the catalyst layer 14 comes into contact with the aqueous electrolyte solution 25, and a cathode electrode 22 immersed in the aqueous electrolyte solution 25. The conductive layer 12 included in the oxygen generation electrode 1 is connected to the cathode electrode 22 with a wire 26 disposed outside of the aqueous electrolyte solution 25. The aqueous electrolyte solution 25 may include, for example, a hydroxide ion. The cathode electrode 22 may be, for example, a platinum (Pt) electrode.

In the oxygen generation apparatus 21, upon the oxygen generation electrode 1 receiving light, electron-hole pairs are generated in the light absorption layer 13 in the above-described manner. The holes oxidize water to an oxygen gas on the surface of the catalyst layer 14. In this case, the following reaction A occurs on the oxygen generation electrode 1, and the following reaction B occurs on the cathode electrode 22.

$$4OH^- + 4h^+ \rightarrow 2H_2O + O_2 \qquad \text{Reaction A}$$

$$2H_2O + 2e^- \rightarrow H_2 + 2OH^- \qquad \text{Reaction B}$$

The aqueous electrolyte solution 25 may alternately include a hydrogen ion. In such a case, the following reaction C occurs on the oxygen generation electrode 1, and the following reaction D occurs on the cathode electrode 22.

$$2H_2O \rightarrow 4H^+ + O_2 + 4e^- \qquad \text{Reaction C}$$

$$4H^+ + 4e^- \rightarrow 2H_2 \qquad \text{Reaction D}$$

Figure 4:
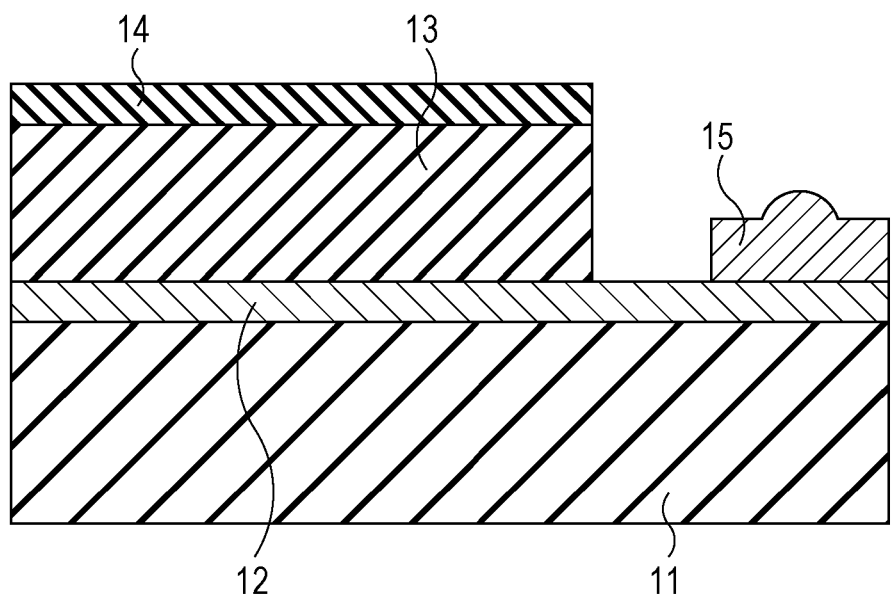
FIG. 4 is a cross-sectional view of a modification example of an oxygen generation electrode according to the first embodiment.

A contact layer 15 is preferably formed on the conductive layer 12 as illustrated in FIG. 4 in order to connect the conductive layer 12 to the wire 26. The contact layer 15 may be, for example, an Au layer. The oxygen generation electrode 1 is not necessarily formed on a side wall of the tank 23.

Figure 5A:
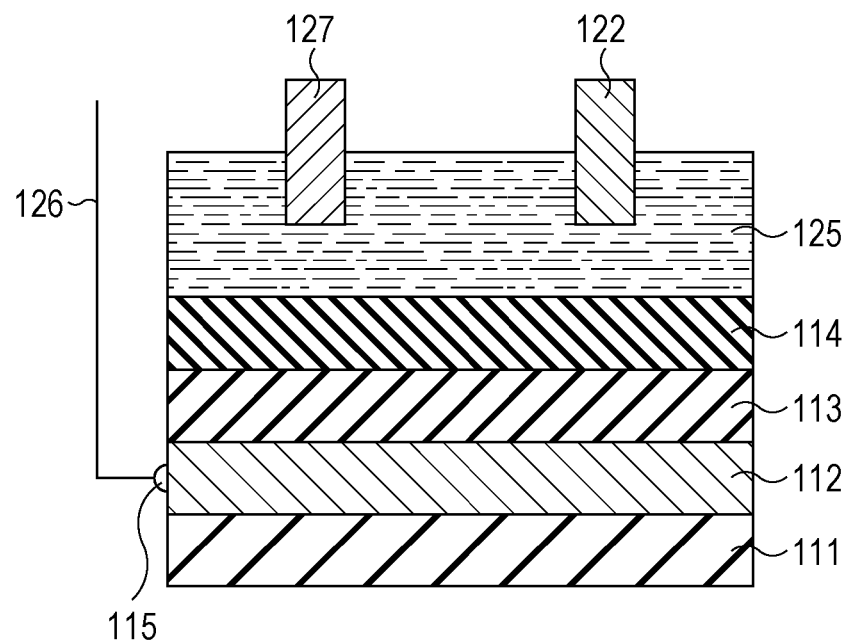
FIGS. 5A and 5B are schematic diagrams illustrating a model of an oxygen generation apparatus.
Figure 5B:
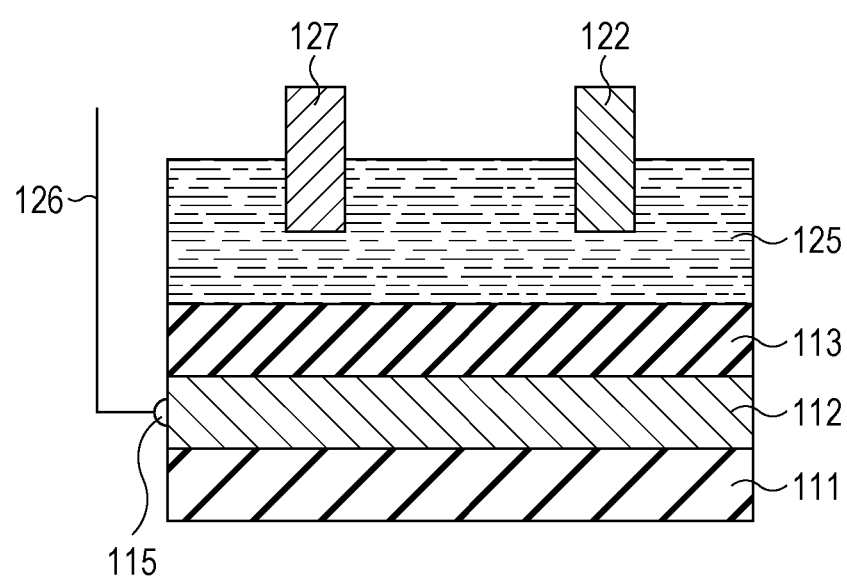
Figure 6A:
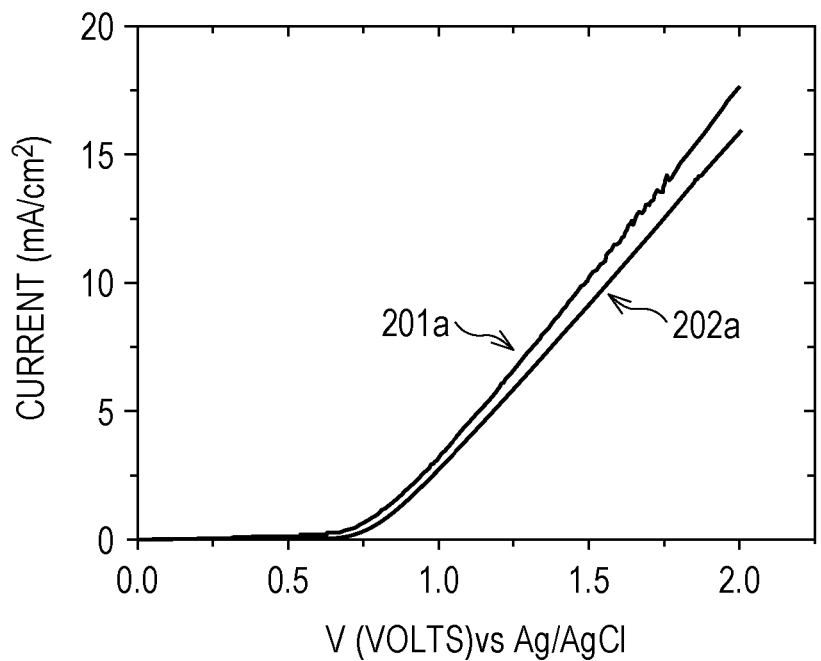
FIGS. 6A and 6B are graphs illustrating voltage-current relationships.
Figure 6B:
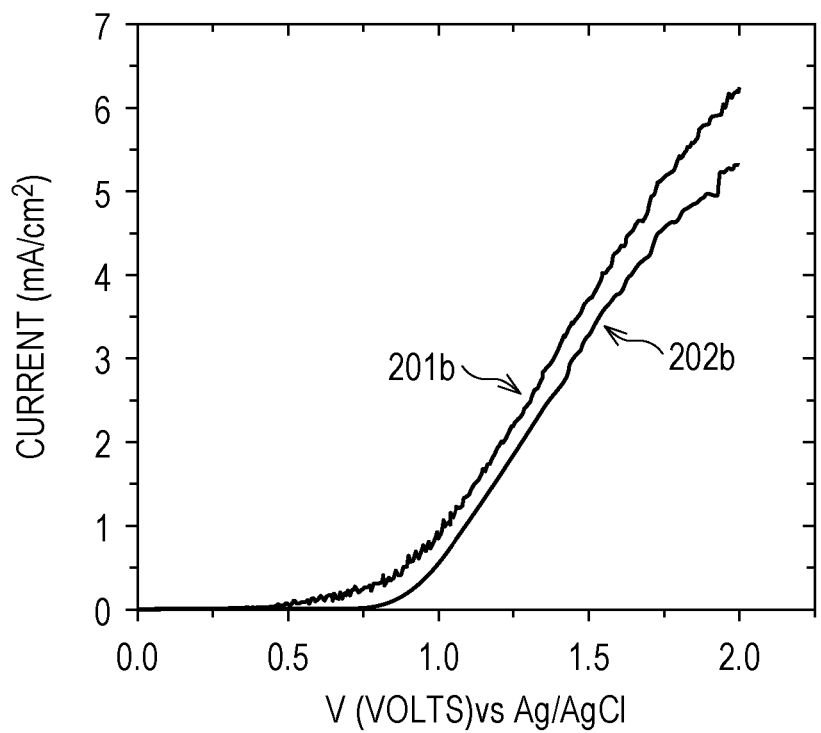

FIG. 6A illustrates the results of the measurement of the current generated in the model schematically illustrated in FIG. 5A. FIG. 6B illustrates the results of the measurement of the current generated in the model schematically illustrated in FIG. 5B. In the models illustrated in FIGS. 5A and 5B, the substrate 111 is a $(La_{0.3}Sr_{0.7})(Al_{0.65}Ta_{0.35})O_3$ (LSAT) substrate having a Miller index of (001), the conductive layer 112 is a $Ba_{0.97}La_{0.03}SnO_3$ (BLSO) layer having a thickness of 60 nm, the light absorption layer 113 is a $BiFeO_3$ (BFO) layer having a thickness of 30 nm, the catalyst layer 114 is a $La_{0.7}Sr_{0.3}CoO_3$ (LSCO) layer having a thickness of 1 nm, and the contact layer 115 is an Au layer.

The aqueous electrolyte solution is a 0.1 M aqueous KOH solution. The counter electrode 122 is a Pt electrode. The reference electrode 127 is an Ag/AgCl electrode. The conductive layer 112 serves as a working electrode. The model illustrated in FIG. 5A is the oxygen generation apparatus according to the embodiment, while the model illustrated in FIG. 5B is a reference example of the oxygen generation apparatus which does not include the catalyst layer 114. The curves 201a and 201b illustrated in FIGS. 6A and 6B denote the current generated in the model when the model is irradiated with light at 800 mW/cm$^2$, while the curves 202a and 202b illustrated in FIGS. 6A and 6B denote the current generated in the model when the model is not irradiated with light. FIG. 7 is a graph illustrating voltage-photo current relationships determined based on the results illustrated in FIGS. 6A and 6B. In FIG. 7, the curve 301a denotes the photo current generated in the model illustrated in FIG. 5A, and the curve 301b denotes the photo current generated in the model illustrated in FIG. 5B.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An oxygen generation apparatus comprising:
   a tank;
   an aqueous electrolyte solution which is charged in the tank;
   an oxygen generation electrode; and
   a cathode electrode immersed in the aqueous electrolyte solution,
   wherein the oxygen generation electrode includes,
   a substrate; and
   a conductive layer disposed over the substrate and including a salt of stannic acid, the salt of stannic acid having a perovskite structure;
   a light absorption layer disposed on the conductive layer and including an oxide having a perovskite structure;
   a catalyst layer disposed on the light absorption layer, the catalyst layer including an oxide having a perovskite structure and being responsible for an oxygen evolution reaction; and
   a contact layer disposed on the conductive layer and at an area in which the light absorption layer is not disposed,
   wherein the conductive layer is doped to degeneracy with impurities, the light absorption layer forms a Type-II heterojunction with the conductive layer, the catalyst layer is doped to degeneracy with impurities, the upper end of the valence band of the catalyst layer is higher than the upper end of the valence band of the light absorption layer, the oxygen generation electrode is arranged such that the catalyst layer comes into contact with the aqueous electrolyte solution,
   wherein the light absorption layer has a band gap of 1 eV or more and 3 eV or less,
   wherein the catalyst layer is disposed at an inner sidewall of the tank and is immersed by the aqueous electrolyte solution,
   the light absorption layer penetrates a sidewall of the tank, and
   the conductive layer is disposed outside of the tank and is coupled to the cathode electrode via the contact layer and a conductive line.

2. The oxygen generation apparatus according to claim 1, wherein the conductive line electrically connects the oxygen generation electrode and the cathode electrode.

3. The oxygen generation apparatus according to claim 1, wherein upon light incident upon the light absorption layer, electron-hole pairs are generated in the light absorption layer and move to the catalyst layer based on energy levels of the light absorption layer and catalyst layer.

4. The oxygen generation apparatus according to claim 1, wherein the salt of stannic acid which is included in the conductive layer is an n-type semiconductor, and the oxide included in the catalyst layer is a p-type semiconductor.

5. The oxygen generation apparatus according to claim 1, wherein the conductive layer includes $Ba_{1-x}La_xSnO_3$, $BaSn_{1-x}Sb_xO_3$, $Sr_{1-x}La_xSnO_3$, or $SrSn_{1-x}Sb_xO_3$, where $0<x<1$.

6. The oxygen generation apparatus according to claim 1, wherein the catalyst layer includes Co, Fe, Ni, or any combination of Co, Fe, and Ni.

7. The oxygen generation apparatus according to claim 1, wherein the light absorption layer includes BiFeO3 or LaFeO3.

8. The oxygen generation apparatus according to claim 1, further comprising:
   a substrate disposed on the conductive layer so as to face the light absorption layer across the conductive layer.

9. The oxygen generation apparatus according to claim 8, wherein the substrate has a band gap of 3 eV or more.

10. The oxygen generation apparatus according to claim 9, wherein the substrate includes $SrTiO_3$, $(La_{0.3}Sr_{0.7})(Al_{0.65}Ta_{0.35})O_3$, $LaAlO_3$, MgO, $NdGaO_3$, or $DyScO_3$.

* * * * *